US010151865B2

(12) United States Patent
Miao et al.

(10) Patent No.: US 10,151,865 B2
(45) Date of Patent: Dec. 11, 2018

(54) COMPACT EXTERNAL GRATING PBS/PBC COUPLER

(71) Applicant: Futurewei Technologies, Inc., Plano, TX (US)

(72) Inventors: Rongsheng Miao, San Jose, CA (US); Yusheng Bai, Los Altos Hills, CA (US)

(73) Assignee: FutureWei Technologies, Inc., Plano, TX (US)

(*) Notice: Subject to any disclaimer, the term of this patent is extended or adjusted under 35 U.S.C. 154(b) by 77 days.

(21) Appl. No.: 14/591,516

(22) Filed: Jan. 7, 2015

(65) Prior Publication Data
US 2015/0316722 A1 Nov. 5, 2015

Related U.S. Application Data

(60) Provisional application No. 61/988,015, filed on May 2, 2014.

(51) Int. Cl.
*G02B 5/30* (2006.01)
*G02B 6/12* (2006.01)
(Continued)

(52) U.S. Cl.
CPC ............ *G02B 5/3083* (2013.01); *G02B 6/262* (2013.01); *G02B 6/264* (2013.01); *G02B 6/2706* (2013.01);
(Continued)

(58) Field of Classification Search
CPC .......... G02B 6/327; G02B 6/32; G02B 6/262; G02B 6/264; G02B 6/2706–6/2733;
(Continued)

(56) References Cited

U.S. PATENT DOCUMENTS 5,987,202 A * 11/1999 Gruenwald .......... G02B 6/4232
264/1.25
6,656,584 B1 * 12/2003 Sugimoto ............. C03C 13/046
385/142
(Continued)

FOREIGN PATENT DOCUMENTS

CN 102540364 A 7/2012
CN 102741721 10/2012
(Continued)

OTHER PUBLICATIONS

PCT International Search Report, PCT Application No. PCT/CN2015/077814, filed Apr. 29, 2015.

*Primary Examiner* — Cara E Rakowski
(74) *Attorney, Agent, or Firm* — Paul Hashim (57) ABSTRACT

Approaches to Compact External Grating PBS/PBC Coupling are described according to embodiments of the present invention. In one embodiment, a YVO4 crystal is used to split a beam or combine multiple beams into a single beam. A lens is used to convert a mode of the light to match a mode of a grating port. A glass wedge is designed to bend the light from horizontal to a nearly vertical orientation to match an exit angle of a grating port. When a source or a receiver utilizes an optical fiber, a fiber holder may be used to bond the fiber to the source or receiver. The PBS/PBC described has much less insertion loss compared to existing 2D grating coupler techniques, and has a wider spectral bandwidth due to flexibility in mode matching compared to existing 2D grating couplers. The PBS/PBC described herein also has a better polarization-extinction ratio than the existing 2D grating couplers, and the horizontal coupling configuration enables a design that is thinner and more compact compared to the near vertical coupling in 2D grating coupling.

27 Claims, 6 Drawing Sheets

(51) Int. Cl.
*G02B 6/26* (2006.01)
*G02B 6/27* (2006.01)
*G02B 6/44* (2006.01)
*G02B 27/28* (2006.01)

(52) U.S. Cl.
CPC ........... *G02B 6/443* (2013.01); *G02B 27/283* (2013.01); *G02B 2006/121* (2013.01)

(58) Field of Classification Search
CPC .. G02B 6/4202; G02B 6/4203; G02B 6/4204; G02B 6/4206; G02B 6/4208; G02B 6/4209; G02B 6/4213; G02B 6/4214; G02B 6/4219; G02B 5/3083; G02B 5/32; G02B 27/283
See application file for complete search history.

(56) References Cited

U.S. PATENT DOCUMENTS

| | | |
|---|---|---|
| 7,065,272 B2 | 6/2006 | Taillaert et al. |
| 7,251,076 B1* | 7/2007 | Okada .................... G02B 5/00 359/489.09 |
| 7,428,358 B2* | 9/2008 | Lu ........................... G02B 6/30 385/129 |
| 2002/0041562 A1* | 4/2002 | Redmond ......... G02B 27/0025 369/112.19 |
| 2005/0168826 A1* | 8/2005 | Koulikov ............. G02B 6/4206 359/641 |
| 2006/0266744 A1* | 11/2006 | Nomaru ............. B23K 26/0057 219/121.75 |
| 2010/0006784 A1 | 1/2010 | Mack et al. |
| 2011/0142395 A1 | 6/2011 | Fortusini et al. |
| 2013/0279844 A1 | 10/2013 | Na et al. |
| 2013/0308898 A1* | 11/2013 | Doerr ..................... G02B 6/428 385/14 |
| 2014/0099057 A1 | 4/2014 | Sun et al. |
| 2016/0054529 A1* | 2/2016 | Yashiki ................. G02B 6/305 385/2 |

FOREIGN PATENT DOCUMENTS

| | | |
|---|---|---|
| CN | 103033877 A | 4/2013 |
| TW | 201415104 A | 4/2014 |
| WO | 2004104664 | 12/2004 |
| WO | 2013089755 | 6/2013 |

* cited by examiner

COMPACT EXTERNAL GRATING PBS/PBC COUPLER

CROSS-REFERENCE TO RELATED APPLICATIONS

The present application claims priority to provisional application Ser. No. 61/988,015, filed on May 2, 2014, entitled "COMPACT EXTERNAL GRATING PBS/PBC COUPLER" naming the same inventors as in the present application. The contents of the above referenced provisional application are incorporated by reference, the same as if fully set forth herein.

FIELD

Embodiments of the present invention generally relate to the field of optical coupling. More specifically, embodiments of the present invention relate to compact polarization beam splitters ("PBS") and polarization beam combiners ("PBC") for optically coupling an optical beam and a silicon photonics chip.

BACKGROUND

Optical waveguides are often employed in integrated optical circuits or used as a transmission medium in optical communication systems to provide coupling from one mode in an optical waveguide to another mode, or from one waveguide to another. Optical fiber is one type of optical waveguide typically composed of a circular cross-section dielectric waveguide consisting of a dielectric material and covered by a second dielectric material with a lower refractive index. Optical fibers are most commonly made from silica glass, but can be also made from other materials such as plastic.

In Si Photonics, current 2D polarization beam splitter (PBS) and polarization beam combiner (PBC) have relatively large insertion loss and low polarization extinction ratio. Insertion loss is the ratio of output to input light power of a certain wavelength. While some approaches use lensed fibers to enhance coupling efficiency, this approach tends to require complex and sensitive sub-micron alignment.

Furthermore, photonic integrated circuits are typically polarization dependent. Because the state of polarization of light is not always constant for a single mode fiber, photonic integrated circuits may need to operate independent of polarization of the light communicated from the fiber.

SUMMARY

An approach to compact polarization beam splitter ("PBS") and polarization beam combiners ("PBC") for optical coupling an optical beam and a silicon photonics chip is described. According to one embodiment, a polarization beam splitter is described and includes a lens that receives an incoming light and produces a focused light, a crystal that receives the focused light from the lens and splits the light into a first ray and a second ray, and a wedge that receives the first ray and the second ray and bends the rays in the direction of a surface of a silicon chip.

According to another embodiment, a method of directing a light source to a surface of a silicon chip is described and includes receiving an incoming light and producing a focused light using a lens, splitting the focused light into a first ray and a second ray using a crystal, and bending the first and second ray towards a surface of a silicon chip using a glass wedge.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Compact External Grating PBS/PBC Coupler

In the following embodiments, an approach is described for providing a compact polarization beam splitter (PBS) and polarization beam combiner (PBC) for the optical coupling of an optical beam and a silicon photonics chip. This approach may be used to split an input optical beam into two individual grating ports on a chip or to combine two beams coming out of two individual grating port into a single output beam.

The approach described herein offers several advantages over existing prior art methods. The PBS/PBC described has much less insertion loss compared to existing 2D grating coupler techniques, and has a wider spectral bandwidth due to flexibility in mode matching (e.g., matching the mode of the grating port) compared to existing 2D grating couplers. The PBS/PBC described herein also has a better polarization-extinction ratio (e.g., 30 dB) than the existing 2D grating couplers (typically 20 dB), and the horizontal coupling configuration enables a design that is thinner and more compact compared to the near vertical coupling used in 2D grating coupling.

According to the present invention, a birefringent crystal (e.g., a YVO4 crystal) is used to split a beam or combine multiple beams into a single beam. A mode of the light is converted using a lens to a mode of a grating port. A glass wedge is designed to direct the light from horizontal to a nearly vertical orientation to match an exit angle of a grating port. When a source or a receiver utilizes an optical fiber, a fiber holder may be used to bond the fiber to the source or receiver. The PBS/PBC disclosed herein may be used in either hermetical or non-hermetical applications.

Figure 1:
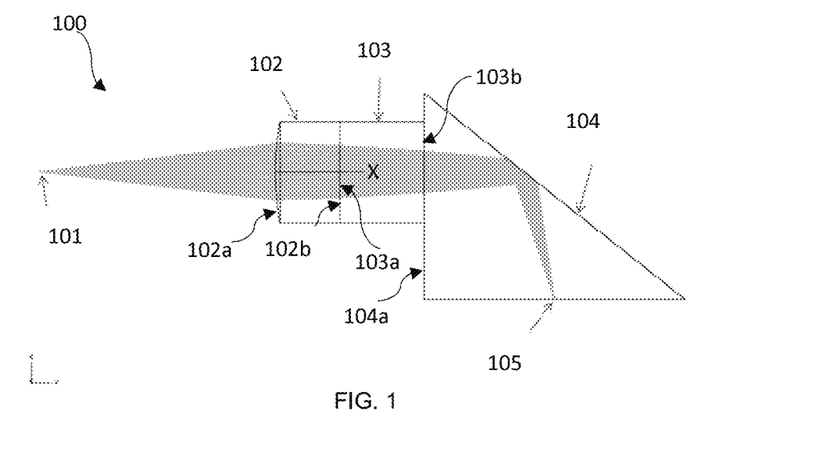
FIG. 1 is a block diagram of an exemplary optical coupler according to embodiments of the present invention.

FIG. 1 illustrates an exemplary PBS according to embodiments of the present invention. A divergent source light 101 is carried by a fiber and focused by lens 102, where the mode of the light exiting the lens matches the mode of the grating port to provide high coupling efficiency. In one embodiment, the lens focuses the incoming light so that a mode of the incoming light is the same as a mode of the grating port. The focused beam produced by lens 102 is received by YVO4 crystal 103. Birefringence properties of the crystal split the light into an ordinary ray ("O-ray") and an extraordinary ray ("E-ray"). Wedge 104 is used to direct (e.g., bend or angle) the beams to grating port 105 of the silicon chip. A lower surface of the wedge is attached and/or bonded to a top surface of the silicon chip (not shown). According to embodiments of the invention, the incident angle of the incoming light matches the exiting angle of the grating port. According to some embodiments, the reflection angle inside of the wedge is larger than the angle of the total reflection.

The lens 102 includes a first lens surface 102a and a second lens surface 102b. The lens 102 receives the incoming light via the first lens surface 102a to produce a focused beam. The focused beam produced by the lens 102 is transmitted to the crystal 103 via the second lens surface 102b.

The crystal 103 abuts against and directly physically contacts the lens 102 at the second lens surface 102b and includes a first crystal surface 103a and a second crystal surface 103b. The crystal 103 splits the focused beam into a first ray (such as "O-ray mentioned above) and a second ray (such as "E-ray" mentioned above) and transmits the first ray and the second ray to the wedge 104 via the second crystal surface 103b.

The wedge 104 abuts against and directly physically contacts the crystal 103 along the second crystal surface 103b at a first wedge surface 104a. The first and second rays pass from the second lens surface 103b of the crystal 103 through first wedge surface 104a and into the wedge 104, which bends or otherwise directs the rays inside of the glass wedge 104 in the direction matching an orientation of a first and a second grating port of a surface of the silicon chip.

As is evident from the foregoing description of the exemplary PBS, the first lens surface 102a, the second lens surface 102b, the first crystal surface 103a, the second crystal surface 103b and the first wedge surface 104a are aligned along a common axis X such that the second lens surface 102b abuts against the first crystal surface 103a, and the second crystal surface 103b abuts against the first wedge surface 104a to render a physically more compact, unitary structural arrangement of elements than has heretofore been possible to achieve. Moreover, physical positioning of the lens 102, crystal 103 and wedge 104 in the foregoing manner minimizes distortion that can otherwise arise from interference associated with structures having gaps between these components.

Figure 2:
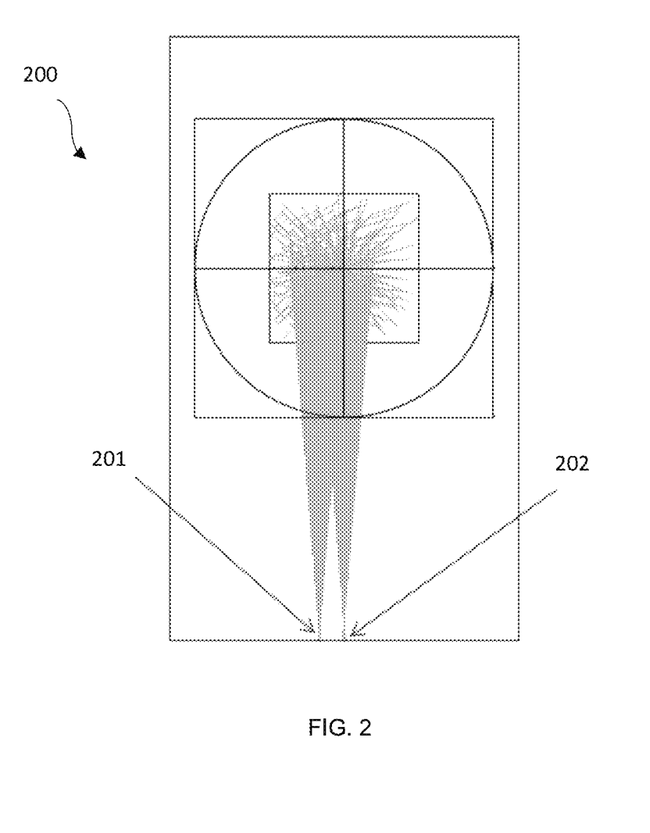
FIG. 2 is a diagram illustrating a front view of the exemplary optical coupler depicted in FIG. 1 according to embodiments of the present invention.

FIG. 2 shows a front view of the exemplary PBS depicted in FIG. 1, where the separation of the O-ray and E-ray can be illustrated. The pitch of O-ray 201 and E-ray 202 is dependent upon the length of the YVO4 crystal (e.g., a 10:1 length to pitch ratio).

Figure 3:
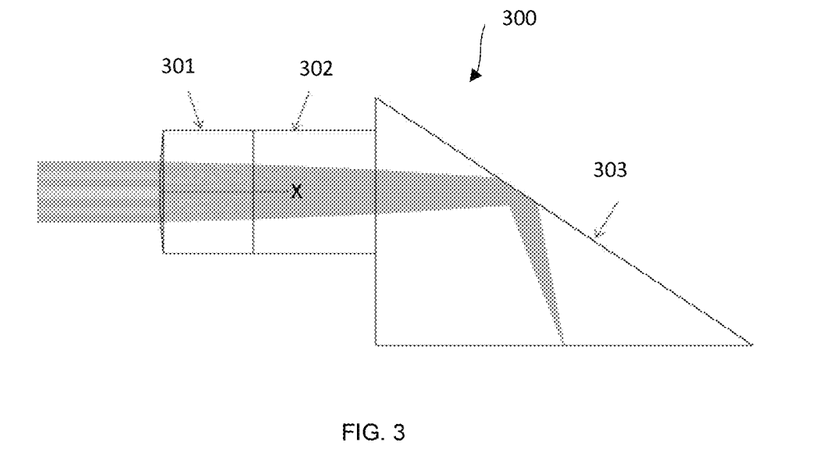
FIG. 3 is a diagram illustrating an exemplary optical coupler where the source is a collimated light according to embodiments of the present invention.

FIG. 3 shows an exemplary PBS/PBC where the source is a collimated light rather than a divergent light (as shown in FIG. 1). As in FIG. 1, the focused beam produced by lens 301 is received by YVO4 crystal 302. Birefringence properties of the crystal split the light into an ordinary ray ("O-ray") and an extraordinary ray ("E-ray"). Glass wedge 303 is used to direct (e.g., bend or angle) the beams to a nearly vertical orientation.

Figure 4:
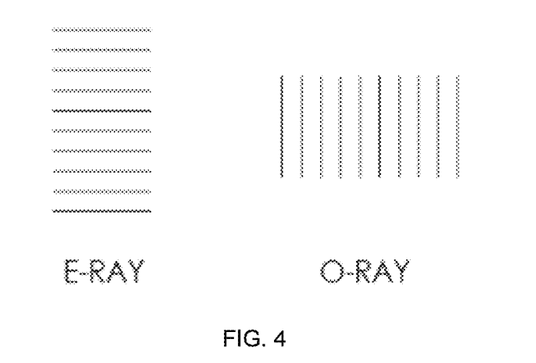
FIG. 4 is a diagram illustrating the grating orientation for an O-ray and an E-ray produced by some embodiments of the present invention.
Figure 5:
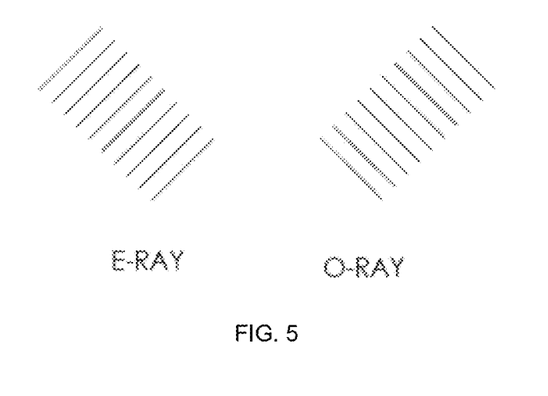
FIG. 5 is a diagram illustrating the grating orientation of an O-ray and an E-ray produced by some embodiments of the present invention, where a half wave plate rotates the polarization of both the O-ray and E-ray by 45 degrees.
Figure 6:
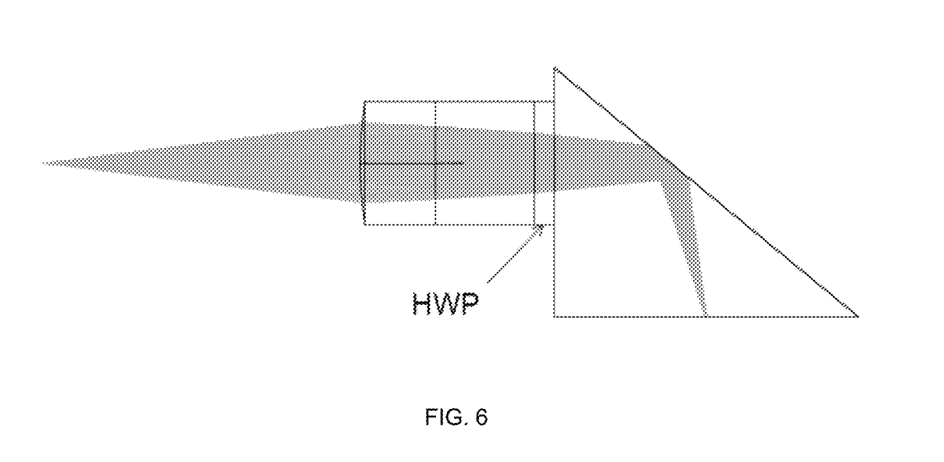
FIG. 6 is a diagram illustrating the exemplary optical coupler of FIG. 1, where a half wave plate is bonded with a glass wedge and a YVO4 crystal according to embodiments of the present invention.
Figure 7:
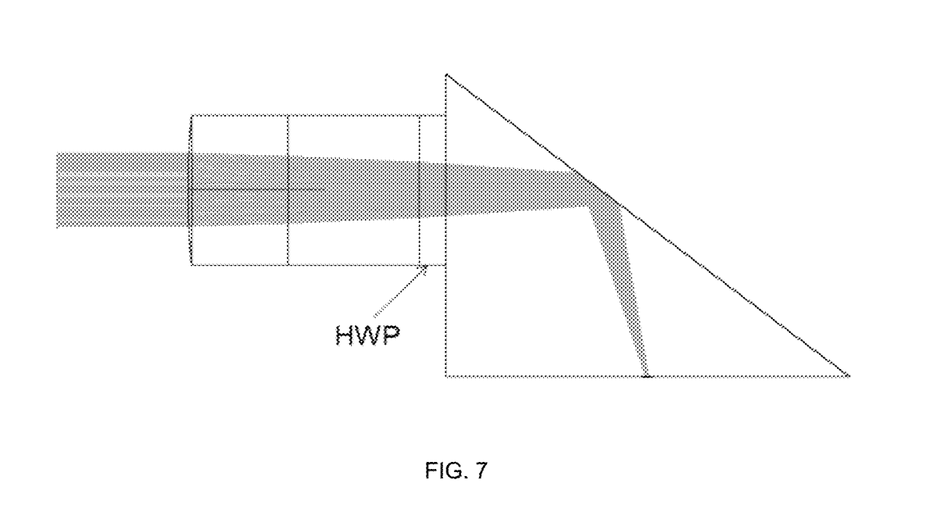
FIG. 7 is a diagram illustrating the exemplary optical coupler of FIG. 3, where a half wave plate is bonded with a glass wedge and a YVO4 crystal according to embodiments of the present invention.
Figure 8:
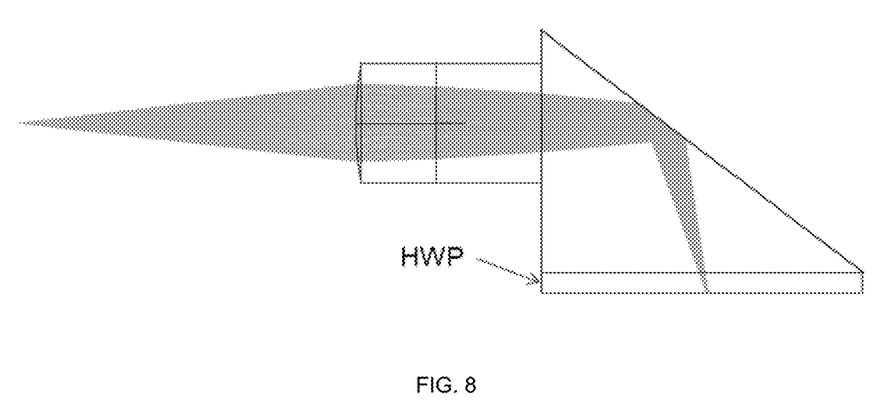
FIG. 8 is a diagram illustrating the exemplary optical coupler of FIG. 1 having a half wave plate beneath a bottom surface of a glass wedge according to embodiments of the present invention.
Figure 9:
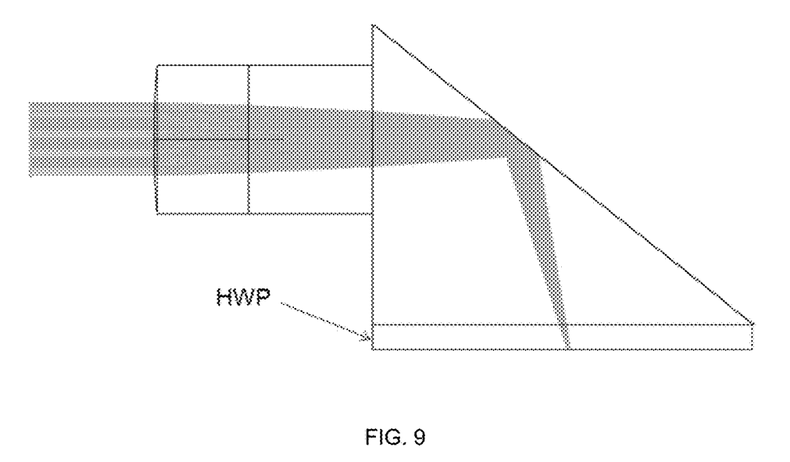
FIG. 9 is a diagram illustrating an exemplary optical coupler of FIG. 3 having a half wave plate beneath a bottom surface of a glass wedge according to embodiments of the present invention.

FIG. 4 illustrates the grating orientation for both O-rays and E-rays. The polarization of the transverse E-field ("TE") waveguide grating ports matches the polarization of the O-ray and E-ray. In some cases it may be preferable to produce two grating ports symmetrically oriented on the chip. According to some embodiments of the present invention, this is accomplished by changing the polarizations of the light exiting from YVO4 crystal at the grating ports. A half wave plate ("HWP") may rotate the polarization of both the O-ray and the E-ray by 45 degrees as shown in FIG. 5. In this way, the back reflection and excess insertion loss may be reduced or eliminated. FIG. 6 and FIG. 7 illustrate the HWP bonding with the glass wedge and YVO4 for certain applications, such as the exemplary PBS shown in FIG. 1 and FIG. 3, respectively. Alternatively, as shown in FIG. 8 and FIG. 9, the HWP may be beneath a bottom surface of the glass wedge, according to some embodiments.

Figure 10:
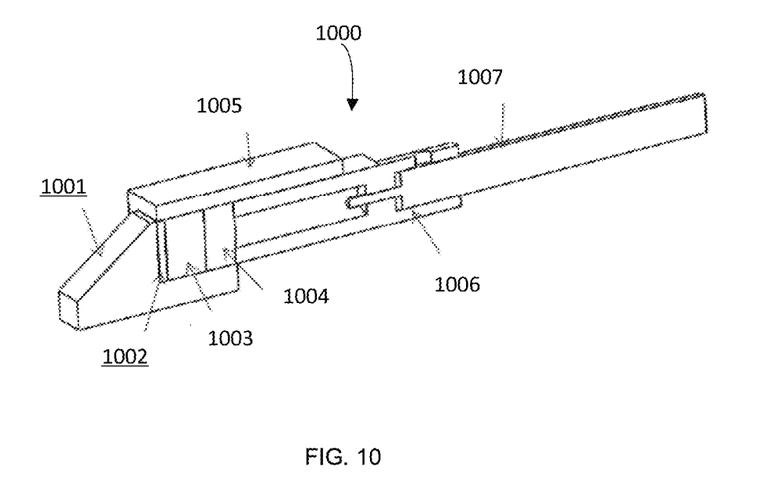
FIG. 10 is a diagram illustrating an exemplary optical coupler based on the design illustrated in FIG. 1 according to embodiments of the present invention.

FIG. 10 is a diagram of an exemplary grating PBS unit, according to embodiments of the present invention. As shown, the exemplary grating PBS unit includes features of the exemplary structure shown in FIG. 6. Fiber holder 1006 bonds fiber 1007 to the unit and glass cover 1005 reinforces the structure of the unit. As shown in FIG. 1, the focused beam produced by lens 1004 is received by YVO4 crystal 1003. Birefringence properties of the crystal split the light into an ordinary ray ("O-ray") and an extraordinary ray ("E-ray"). Glass wedge 1001 is used to direct (e.g., bend or angle) the beams as desired. As depicted in FIG. 6, HWP 1002 is bonded with the glass wedge 1001 and YVO4 crystal 1003.

Figure 11:
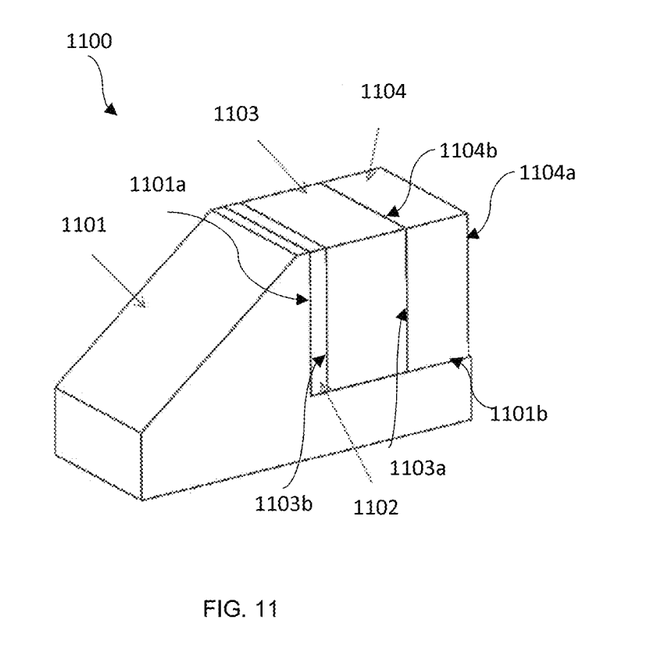
FIG. 11 is a diagram illustrating an exemplary optical coupler based on the design illustrated in FIG. 3 according to embodiments of the present invention.

FIG. 11 is a diagram of an exemplary grating PBS unit, according to embodiments of the present invention. As shown, the exemplary grating PBS unit includes features of the exemplary structure shown in FIG. 7, where incoming light is a collimated light beam (also shown in FIG. 3). Both units may be aligned and coupled to the grating port. As in FIG. 3, the focused beam produced by lens 1104 is received by crystal 1103. The crystal can be in the form of a YVO4 crystal, the birefringence properties of which enable the crystal 1103 to split the light into an ordinary ray ("O-ray") and an extraordinary ray ("E-ray"). Wedge 1101 is used to directs (i.e., bend or angle) the beams as desired. As depicted in FIG. 7, half wave plate (HWP) 1102 is bonded with the wedge 1101 and crystal 1103.

The lens 1104 includes a first lens surface 1104a and a second lens surface 1104b. The lens 1104 receives the incoming light via the first lens surface 1104a to produce a focused beam. The focused beam produced by the lens 1104 is transmitted to the crystal 1103 via the second lens surface 1104b, which abuts against the crystal 1103.

The crystal 1103 includes a first crystal surface 1103a and a second crystal surface 1103b. The first crystal surface 1103a is in direct physical contact with the second lens surface 1102b and receives the focused beam as the beam passes through the second lens surface 1104b of the lens 1104. The crystal 1103 splits the focused beam into a first ray and a second ray in the manner described previously in connection with the exemplary PBS described in connection with FIG. 1, and transmits the first and second rays to the wedge 1101 via the second crystal surface 1103b.

A half wave plate (HWP) 1102 bonds the wedge 1101 to the crystal 1103. The wedge 1101 includes a first wedge surface 1101a, a second wedge surface 1101b, and a third wedge surface 1101c. The first wedge surface 1101a is coupled to the second crystal surface 1103b by the HWP 1102, which bonds the first wedge surface 1101a with the second crystal surface 1103b. Lens 1104, crystal 1103 and HWP 1102 are supported by the wedge 1101 along wedge surface 1101b, which surface is substantially parallel to the path of the beam passing through the lens 1104 and crystal 1103. The first wedge surface 1101a receives the first and second rays from the second lens surface 1103b of the crystal 1103, and the wedge 1101 bends or angles the rays and inside of the wedge 1101 in the direction matching the orientation of one or more grating ports of a surface of silicon chip (not shown) adjacent to wedge surface 1101c.

Figure 12:
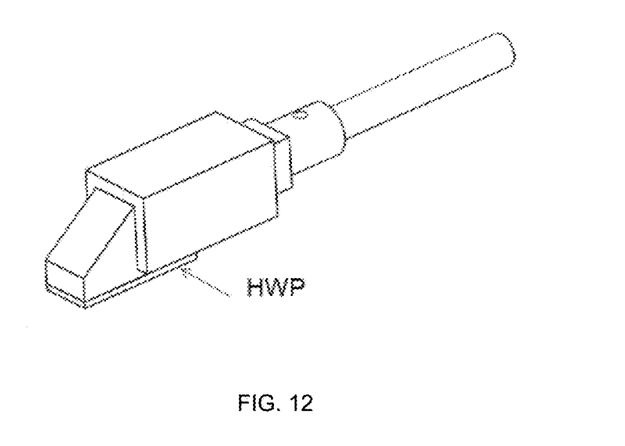
FIG. 12 is a diagram illustrating an exemplary optical coupler where a half wave plate is bonded to a bottom surface of a glass wedge according to embodiments of the present invention.
Figure 13:
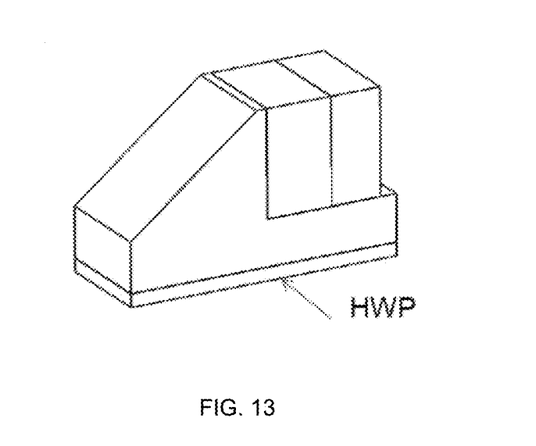
FIG. 13 is a diagram illustrating an exemplary optical coupler where a half wave plate is bonded to a bottom surface of a glass wedge according to embodiments of the present invention.

FIG. 12 and FIG. 13 are schematic diagrams illustrating exemplary approaches to bonding a HWP to the exemplary optical structures shown in FIG. 8 and FIG. 9, respectively.

What is claimed is:

1. A polarization beam splitter, comprising:
a lens comprising a first lens surface and a second lens surface, wherein the lens is configured to receive incoming light via the first lens surface to produce a focused beam;
a crystal comprising a first crystal surface and a second crystal surface, the first crystal surface being in physical contact with the second lens surface of the lens, the first crystal surface receiving the focused beam from the second lens surface of the lens, the crystal splitting the focused beam into a first ray and a second ray; and
a wedge comprising a first wedge surface that receives the first ray and the second ray from the second crystal surface, the first wedge surface coupled to the second crystal surface, the wedge bending or otherwise redirecting the first ray and the second ray inside of the wedge in a direction corresponding to an orientation of a first and a second grating port of a surface of a silicon chip, the lens, crystal and first wedge surface being aligned along a common axis and positioned sequentially such that the second lens surface is in physical contact with the first crystal surface, and the second crystal surface is coupled to the first wedge surface to provide a unitary structural arrangement of elements.

2. The polarization beam splitter of claim 1, wherein a lower surface of the wedge is coupled to a surface of the silicon chip.

3. The polarization beam splitter of claim 1, wherein the first ray is an ordinary ray and the second ray is an extraordinary ray.

4. The polarization beam splitter of claim 1, wherein the crystal has birefringence properties.

5. The polarization beam splitter of claim 1, wherein the crystal is a yttrium orthovanadate (YVO4) crystal.

6. The polarization beam splitter of claim 1, wherein an angle of reflection inside of the wedge is larger than an angle of total reflection inside of the wedge.

7. The polarization beam splitter of claim 1, wherein an incident angle of the incoming light is directed by the wedge to match an exit angle of the first and second grating ports.

8. The polarization beam splitter of claim 1, wherein a polarization-extinction ratio of the first and second rays is between 25 dB and 35 dB.

9. The polarization beam splitter of claim 1, wherein the wedge bends or otherwise redirects light from a nearly horizontal orientation to a nearly vertical orientation to match an exit angle of the first and second grating ports of the silicon chip.

10. The polarization beam splitter of claim 1, further comprising a light source that produces the incoming light as a collimated light.

11. The polarization beam splitter of claim 1, further comprising a light source that produces the incoming light as a divergent light.

12. The polarization beam splitter of claim 1, further comprising a fiber holder that bonds an optical fiber to the polarization beam splitter.

13. The polarization beam splitter of claim 12, further comprising a cover bonded to the fiber holder and the polarization beam splitter that improves structural rigidity of the polarization beam splitter.

14. The polarization beam splitter of claim 1, wherein the first lens surface, the second lens surface, the first crystal surface, the second crystal surface, and the first wedge surface are parallel.

15. The polarization beam splitter of claim 1, further comprising a half wave plate having first and second surfaces positioned opposite one another, the first surface of the half wave plate physically contacting the second crystal surface and the second surface of the half wave plate physically contacting the first wedge surface.

16. The polarization beam splitter of claim 1, wherein the wedge further comprises a second wedge surface which is perpendicular to the first wedge surface, the second wedge surface supporting the lens and the crystal.

17. A method of directing a light source, comprising:
receiving an incoming light and producing a focused beam using a lens;
splitting the focused beam into a first ray and a second ray using a crystal; and bending the first ray and the second ray towards a surface of a silicon chip using a wedge, wherein the first ray and the second ray are respectively bent or otherwise redirected inside of the wedge in a direction matching an orientation of a first and a second grating port of the surface of the silicon chip;
wherein the lens, crystal and a first surface of the wedge are aligned along a common axis and are positioned sequentially such that a second lens surface is in physical contact with a first crystal surface, and a second crystal surface is coupled to the first wedge surface to provide a unitary structural arrangement of elements through which the focused beam passes.

18. The method of claim 17, wherein the first ray is an ordinary ray and the second ray is an extraordinary ray.

19. The method of claim 17, wherein the crystal has birefringence properties.

20. The method of claim 17, wherein the crystal is a yttrium orthovanadate (YVO4) crystal.

21. The method of claim 17, wherein an angle of reflection inside of the one wedge is larger than an angle of total reflection inside of the wedge.

22. The method of claim 17, wherein an incident angle of the incoming light is directed by the wedge to match an exit angle of the first and second grating ports.

23. The method of claim 17, wherein a polarization-extinction ratio of the first ray and the second ray is between 25 dB and 35 dB.

24. The method of claim 17, wherein the wedge directs light from a nearly horizontal orientation to a nearly vertical orientation to match an exit angle of the first and second grating ports of the silicon chip.

25. The method of claim 17, wherein a first lens surface, the second lens surface, the first crystal surface, the second crystal surface, and the first wedge surface are parallel.

26. The method of claim 17, further comprising a half wave plate having first and second surfaces positioned opposite one another, the first surface of the half wave plate physically contacting the second crystal surface and the second surface of the half wave plate physically contacting the first wedge surface.

27. The method of claim 17, wherein the wedge further comprises a second wedge surface which is perpendicular to the first wedge surface, the second wedge surface supporting the lens and the crystal.

* * * * *